(12) United States Patent
Passerini et al.

(10) Patent No.: US 7,610,320 B2
(45) Date of Patent: Oct. 27, 2009

(54) TECHNIQUE FOR REMAPPING DATA IN A STORAGE MANAGEMENT SYSTEM

(75) Inventors: Ronald Peter Passerini, Somerville, MA (US); Robert Warren Perry, Leominster, MA (US); Christopher Angelo Rocca, Burlington, MA (US); Michael Daniel Anthony, Wilmington, MA (US)

(73) Assignee: Symantec Corporation, Cupertino, CA (US)

( * ) Notice: Subject to any disclaimer, the term of this patent is extended or adjusted under 35 U.S.C. 154(b) by 392 days.

(21) Appl. No.: 11/549,401

(22) Filed: Oct. 13, 2006

(65) Prior Publication Data
US 2007/0088767 A1    Apr. 19, 2007

Related U.S. Application Data

(60) Provisional application No. 60/726,192, filed on Oct. 14, 2005.

(51) Int. Cl.
*G06F 17/30* (2006.01)

(52) U.S. Cl. .......................................... 707/204; 714/15

(58) Field of Classification Search .................... 707/1, 707/100, 200, 204; 711/100; 715/5, 15, 715/21
See application file for complete search history.

(56) References Cited

U.S. PATENT DOCUMENTS 6,321,290 B1 * 11/2001 Yamashita .................. 711/100
6,732,293 B1 *  5/2004 Schneider .................... 714/15
6,804,690 B1 * 10/2004 Dysert et al. ................ 707/204

* cited by examiner

*Primary Examiner*—Fred I Ehichioya
(74) *Attorney, Agent, or Firm*—Hunton & Williams LLP (57) ABSTRACT

A technique for remapping data in a storage management system is disclosed. In one particular exemplary embodiment, the technique may be realized as a method for remapping data in a storage management system having backup data that enable restoration of historical data of a storage system. The method may comprise receiving at least one access request for a first set of historical data. The method may also comprise identifying a second set of historical data, wherein the first set of historical data is a subset of the second set of historical data. The method may further comprise identifying, in the storage management system, one or more storage locations containing backup data for the second set of historical data. The method may additionally comprise storing a mapping list of the one or more identified storage locations to facilitate subsequent access requests for any of the second set of historical data.

14 Claims, 3 Drawing Sheets

TECHNIQUE FOR REMAPPING DATA IN A STORAGE MANAGEMENT SYSTEM

CROSS-REFERENCE TO RELATED APPLICATIONS

This patent application claims priority to U.S. Provisional Patent Application No. 60/726,192, filed Oct. 14, 2005, which is hereby incorporated by reference herein in its entirety.

This patent application is related to U.S. patent application Ser. No. 10/924,652, filed Aug. 24, 2004, which is a continuation-in-part of U.S. patent application Ser. No. 10/668,833, filed Sep. 23, 2003, each of which is hereby incorporated by reference herein in its entirety.

FIELD OF THE DISCLOSURE

The present disclosure relates generally to data storage and, more particularly, to a technique for remapping data in a storage management system.

BACKGROUND OF THE DISCLOSURE

In related U.S. patent application Ser. No. 10/924,652 and U.S. patent application Ser. No. 10/668,833, a time-dependent data storage and recovery technique is disclosed. Embodiments of such a technique provide a solution for continuous data protection (CDP) wherein write commands directed to a storage system are intercepted by a storage management system having a current store and a time store. The current store may maintain or have access to a current (or mirror) copy of the storage system's digital content. In one embodiment, the current store may be presented to the storage system as primary volumes. In another embodiment, the current store may be presented as secondary volumes which are referred to as "TimeSafe volumes." The time store may record information associated with each intercepted write command, such as new data in the write command's payload or old data to be overwritten in response to the write command. Recordation of the new or old data in response to a write command may be referred to as a copy-on-write (COW) operation, and the new and/or old data recorded may be referred to as COW data. The time store may also record other information (i.e., metadata) associated with an intercepted write command and/or the corresponding COW operation, such as, for example, a timestamp, an original location in the current store (or TimeSafe volumes) where the old data are overwritten, and a destination location in the time store to which the COW data are copied.

Figure 1:
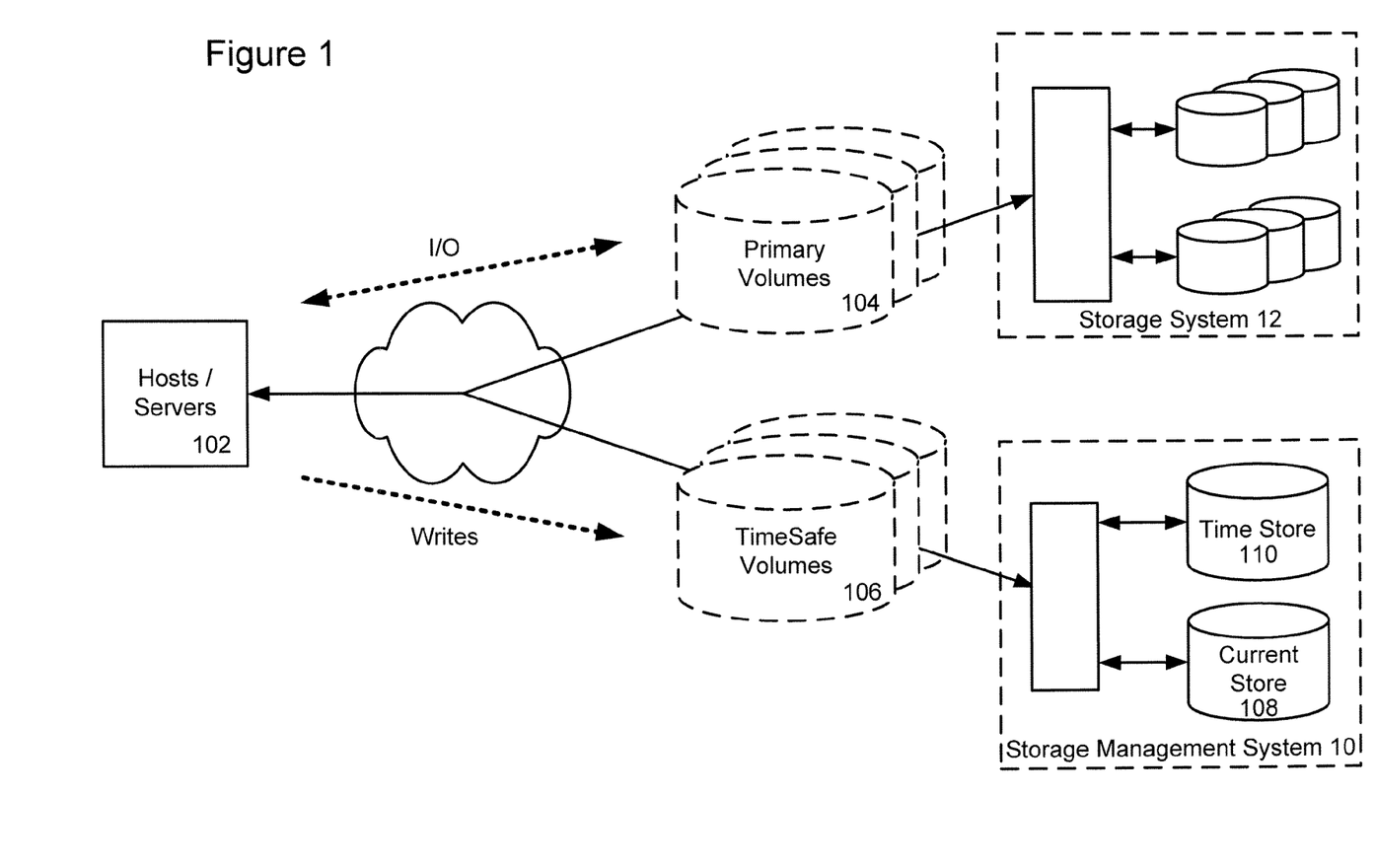
FIG. 1 shows a system diagram illustrating an exemplary time-dependent storage management system in relation to a storage system and hosts/servers.

FIG. 1 shows a system diagram illustrating an exemplary time-dependent storage management system 10 in relation to a storage system 12 and hosts/servers 102. The storage system 12 presents primary volumes 104 to the hosts/servers 102, and a current store 108 in the storage management system 10 presents TimeSafe volumes (secondary volumes) 106 to the hosts/servers 102. When the primary volumes 104 receive input/output (I/O) requests from the hosts/servers 102, the write requests may be simultaneously forwarded to or intercepted by the storage management system 10. COW operations may cause backup data to be recorded in a time store 110 in the storage management system 10, and a mirror/current copy of the digital content of the storage system 12 may be maintained in the current store 108.

Each COW operation typically backs up one or more blocks of COW data, thereby creating one set of COW data and corresponding metadata. Over a period of time, multiple sets of COW data and corresponding metadata (including timestamps) may be accumulated as a collection of historical records of what have been written or overwritten in the current store or the storage system. The content of the time store may be indexed (e.g., in "indexing tables") based on the metadata to facilitate efficient access to the COW data.

With a current copy of the storage system's digital content in the current store and the historical records in the time store, the storage management system adds a new dimension, i.e., time, to the storage system. Assuming the storage management system has been operatively coupled to the storage system since a past time, the storage management system may quickly and accurately restore any addressable content in the storage system to any point in time between the past time and a present time. For example, the storage management system may be capable of providing a snapshot of the digital content of the storage system (or a portion thereof) that existed at a specified past time $T_1$. The snapshot at time $T_1$ may be presented in the form of a virtual disk known as a "time image." The storage management system may also be capable of instantly restoring the storage system (or a portion thereof) to a state as it existed at a specified past time $T_2$, which operation is referred to as an "instant restore." The instant restore may be either non-destructive or destructive depending on whether the data overwritten during the restoration are recorded in the time store or discarded. A time image or a TimeSafe LUN (logical unit) in an instant restore mode may continue to receive I/O requests, such as reads and writes. Such I/O requests may be referred to as "time image reads" and "time image writes" if directed to a time image, or "instant restore reads" and "instant restore writes" if directed to a TimeSafe LUN in an instant restore mode.

In a storage system protected by the storage management system as briefly described above, it is often desirable for a user to query historical data such as those that existed at a specified address (or address range) at a specified past time. By generating a time image or performing an instant restore based on the specified address and time, such historical data may be accessed by the user. However, it is inefficient for the storage management system to generate a time image or to perform an instant restore every time I/O requests for some historical data are received. There exists a need for a general-purpose query engine that can efficiently respond to I/O requests for historical data.

In view of the foregoing, it would be desirable to provide a solution for data storage management which overcomes the above-described inadequacies and shortcomings.

SUMMARY OF THE DISCLOSURE

A technique for remapping data in a storage management system is disclosed. In one particular exemplary embodiment, the technique may be realized as a method for remapping data in a storage management system having backup data that enable restoration of historical data of a storage system. The method may comprise receiving at least one access request for a first set of historical data. The method may also comprise identifying a second set of historical data, wherein the first set of historical data is a subset of the second set of historical data. The method may further comprise identifying, in the storage management system, one or more storage locations containing backup data for the second set of historical data. The method may additionally comprise storing a mapping list of the one or more identified storage locations to facilitate subsequent access requests for any of the second set of historical data.

In accordance with other aspects of this particular exemplary embodiment, the method may further comprise: receiving a subsequent access request for a third set of historical data; and fulfilling the subsequent access request based on the stored mapping list of the one or more identified storage locations if the third set of historical data is a subset of the second set of historical data.

In accordance with further aspects of this particular exemplary embodiment, the second set of historical data may be associated with a zone of contiguous storage units in the storage system. The method may further comprise repeating the steps recited therein for multiple zones in the storage system to generate and store multiple mapping lists, one mapping list for each of the multiple zones. The method may also comprise deleting a least recently used mapping list when there is a shortage of storage space for the multiple mapping lists.

In accordance with additional aspects of this particular exemplary embodiment, the mapping list may be cached for fast access.

In accordance with another aspect of this particular exemplary embodiment, the method may further comprise updating the stored mapping list to reflect changes made to the backup data for the second set of historical data.

In another particular exemplary embodiment, the techniques may be realized as a method for remapping data in a storage management system having a time store and a current store, the current store maintaining a mirror copy of current data of a storage system and the time store recording copy-on-write data for historical data of the storage system. The method may comprise selecting a zone in the storage system for which access requests for historical data are anticipated. The method may also comprise identifying, in the time store, one or more first storage locations containing copy-on-write data for the historical data associated with the zone. The method may further comprise recording the one or more first storage locations in a mapping list to facilitate subsequent access requests for the historical data associated with the zone.

In accordance with other aspects of this particular exemplary embodiment, the method may further comprise: identifying, in the current store, one or more second storage locations corresponding to a portion of the zone for which there is no copy-on-write data available in the time store; and recording the one or more second storage locations in the mapping list.

In accordance with further aspects of this particular exemplary embodiment, the step of selecting the zone may further comprise receiving a threshold number of access requests for any of the historical data associated with the zone.

In accordance with additional aspects of this particular exemplary embodiment, the step of identifying the one or more first storage locations may further comprise scanning an indexing table containing metadata associated with the copy-on-write data in the time store.

In accordance with another aspect of this particular exemplary embodiment, the historical data associated with the zone existed therein at a past time specified in the anticipated and subsequent access requests.

In accordance with yet another aspect of this particular exemplary embodiment, the anticipated and subsequent access requests may include one or more access requests selected from a group consisting of: time image reads, time image writes, instant restore reads, and instant restore writes.

In accordance with still another aspect of this particular exemplary embodiment, the method may further comprise updating the mapping list to reflect relevant changes in the copy-on-write data in the time store.

In accordance with a further aspect of this particular exemplary embodiment, the method may further comprise repeating the steps recited therein for multiple zone, thereby generating multiple mapping lists, one mapping list for each zone. The method may also comprise deleting, from the multiple mapping lists, one mapping list that is least recently used.

In yet another particular exemplary embodiment, the techniques may be realized as at least one signal embodied in at least one carrier wave for transmitting a computer program of instructions configured to be readable by at least one processor for instructing the at least one processor to execute a computer process for performing the method as recited above.

In still another particular exemplary embodiment, the techniques may be realized as at least one processor readable carrier for storing a computer program of instructions configured to be readable by at least one processor for instructing the at least one processor to execute a computer process for performing the method as recited above.

In a further particular exemplary embodiment, the techniques may be realized as a system for remapping data in a storage management system having backup data that enable restoration of historical data of a storage system. The system may comprise means for receiving at least one access request for a first set of historical data. The system may also comprise means for identifying a second set of historical data, wherein the first set of historical data is a subset of the second set of historical data. The system may further comprise means for identifying, in the storage management system, one or more storage locations containing backup data for the second set of historical data. The system may additionally comprise means for storing a mapping list of the one or more identified storage locations to facilitate subsequent access requests for any of the second set of historical data.

In a yet further particular exemplary embodiment, the techniques may be realized as a system for remapping data in a storage management system having a time store and a current store, the current store maintaining a mirror copy of current data of a storage system and the time store recording copy-on-write data for historical data of the storage system. The system may comprise: means for selecting a zone in the storage system for which access requests for historical data are anticipated. The system may also comprise means for identifying, in the time store, one or more first storage locations containing copy-on-write data for the historical data associated with the zone. The system may additionally comprise means for recording the one or more first storage locations in a mapping list to facilitate subsequent access requests for the historical data associated with the zone.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

In the detailed description that follows, references will be made to embodiments of the time-dependent data storage and recovery technique such as those disclosed in U.S. patent application Ser. No. 10/924,652 and U.S. patent application Ser. No. 10/668,833. It should be appreciated that embodiments of the present disclosure are easily adaptable to other data protection methods or systems that maintain historical records of digital content of a storage system.

A typical "storage system" may comprise one or more storage devices which may be physical, virtual or logical devices or a combination thereof. According to one embodiment, a storage system may comprise a storage area network (SAN) having one or more datasets, wherein each dataset may comprise one or more nodes, and wherein one or more logical units (LUNs) may be coupled to each node. Hereinafter, for ease of illustration, the term "storage system" may refer to an entire storage system or a portion (e.g., dataset or node) thereof.

As used herein, "backup data" refers generally to data that have been recorded and/or organized (or even re-organized) with a purpose of restoring or recovering digital content of a storage system.

"Copy-on-write data" (or "COW data") refers to substantive data (e.g., new data to be written or old data to be overwritten in response to a write command) that have been recorded in a copy-on-write operation. New data to be written in response to a write command are sometimes referred to as "after image data" or "after image," while old data to be overwritten in response to a write command are sometimes referred to as "before image data" or "before image."

"Corresponding metadata" refers to informational data (e.g., timestamps and storage addresses) regarding the associated COW data in a copy-on-write operation. Typically, one copy-on-write operation causes one set of COW data and corresponding metadata to be created. Despite their correlation, COW data and corresponding metadata may be stored in separate storage devices or segments.

In a time store, COW data may be organized in one or more "chunks" that serve as units of allocation of time store storage. According to one embodiment, COW data, as they are being collected, may be initially cached in an "indexing chunk." As the indexing chunk reaches a predetermined size, it may be sealed up, timestamped, and stored in the time store as one unit. According to embodiments of the present disclosure, each time store LUN may be divided into a plurality of fixed-size logical partitions (e.g., a few Gigabytes (GB) each) for ease of management and for load balancing purposes, wherein each fixed-size logical partition may be referred to as one "slice." Similarly, a host-facing LUN may be divided up into regions known as "zones."

Embodiments of the present disclosure provide a technique for remapping data in a storage management system in order to facilitate more efficient access to historical data that were present in a storage system at specified address(es) and time. Access requests for historical data may be accommodated even when a corresponding time image has not been created and an instant restoration of the relevant portion of the storage system is not performed. The data remapping functionalities may be referred to, collectively, as a "remap engine."

In a time-dependent storage management system having a time store and a current store, a remap engine may be a system component that acts as a general-purpose query engine to find addresses of blocks in the time store in response to requests such as "Show me block range X-Y at Time T." The remap engine may be used for operations associated with both time images and instant restores, as well as for querying the time store content without any time image or instant restore. Additionally, the remap engine may reduce metadata storage requirement by implementing a caching scheme for storing region maps on a slice basis, removing them in a least-recently-used (LRU) manner.

Figure 2:
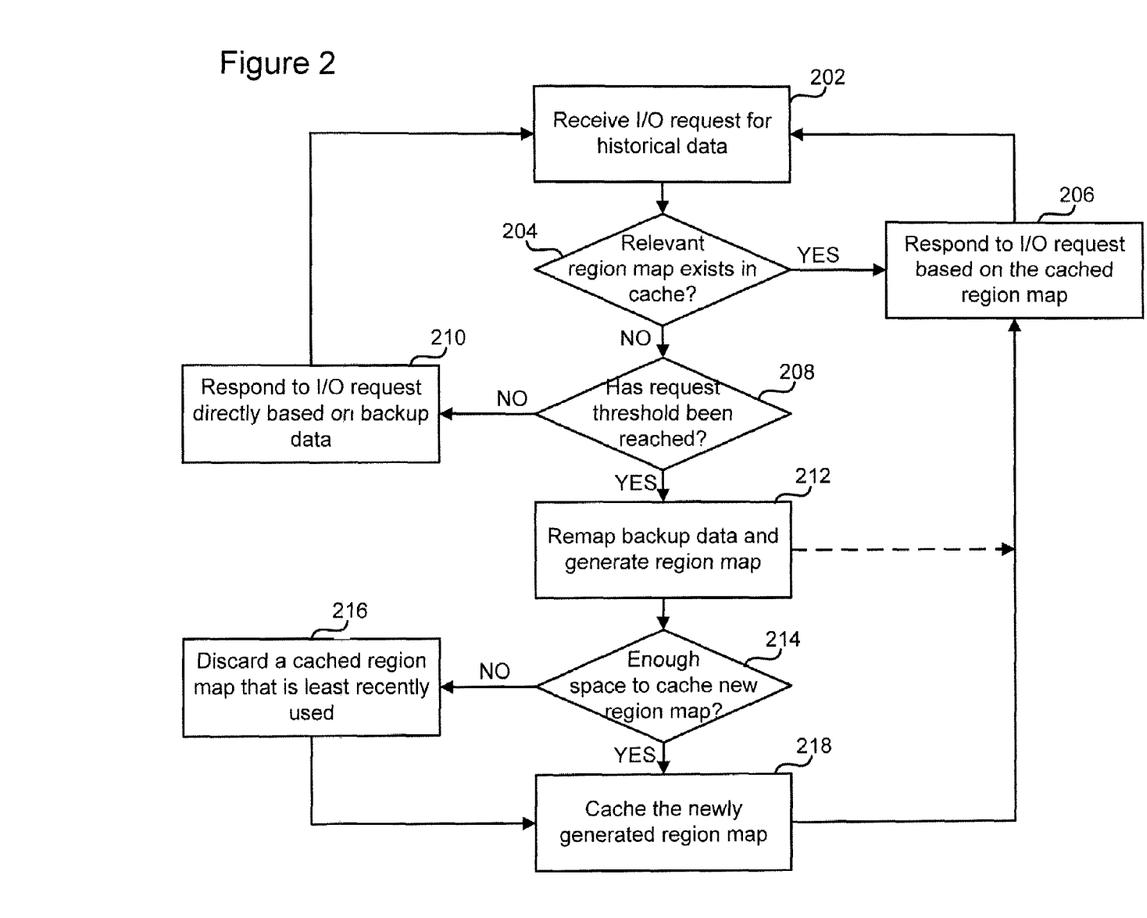
FIG. 2 shows a flow chart illustrating an exemplary method for remapping data in a storage management system in accordance with embodiments of the present disclosure.

FIG. 2 shows a flow chart illustrating an exemplary method for remapping data in a storage management system in accordance with embodiments of the present disclosure. The storage management system may be operatively coupled to a storage system to provide data backup or data protection services.

In step 202, the storage management system may receive, from a host, an I/O request for historical data in the storage system. The I/O request may specify an address or address range ADDR and a past time T for the requested historical data. That is, I/O request is directed at a set of historical data that existed at time T and were stored at the specified address or address range ADDR in the storage system. The I/O request may be a read or write request directed at a time image, known as a "time image read" or a "time image write." The I/O request may also be a read or write request directed at a portion of the storage system in an instant restore mode, which read and write requests may be referred to as an "instant restore read" and an "instant restore write."

Since the storage system typically stores and organizes backup data in a way that does not allow a straightforward access to the requested historical data based on ADDR and T, some on-demand computation is often necessary to determine where the backup data relevant to the requested historical data are stored in the storage system. Such on-demand computation often slows down the processing of the I/O request. To solve this problem, embodiments of the present disclosure employ pre-computed and cached region maps or mapping lists to facilitate faster access to historical data. A region map or mapping list may record a correlation between the storage locations in the storage management system and a particular set of historical data (e.g., at time T) associated with a "zone" comprising contiguous storage units in the storage system. By referring to the region map, an I/O process may instantly know where in the storage management system to locate the backup data needed to reconstruct or access the historical data.

Therefore, in step 204, it may be determined whether any relevant region map exists (in the cache) for the requested historical data. This step may involve determining to which zone the requested historical data belong and whether a region map has already been generated for that zone. If a relevant region map does exist, then, in step 206, the storage management system may respond to the I/O request based on the region map.

If, however, a relevant region map does not exist in the cache, it may be determined in step 208 whether a request threshold has been reached. According to embodiments of the present disclosure, the generation of region maps may be based on actual or anticipated I/O requests received for a particular set of historical data associated with a particular zone. According to some embodiments, it may be desirable to remap backup data for a zone as soon as a first I/O request is received for any historical data associated with that zone. According to other embodiments, it may be more desirable to implement a threshold strategy as illustrated herein.

If a threshold number of I/O requests has not been received for a particular zone, then, in step 210, the storage management system may respond to the I/O request directly by looking up the relevant backup data and reconstructing the requested historical data.

If a threshold number of I/O requests has been received for the particular zone to which the requested historical data belong, then the backup data in the storage management system may be remapped in step 212 to generate a region map for this zone. The region maps are preferably cached to facilitate fast access to historical data. However, a storage space allocated for caching the region maps is typically limited.

Therefore, in step 214, it may be determined whether there is sufficient space to cache the region map newly generated in step 212. If so, the new region map may be cached in step 218. Otherwise, an older region map may be discarded in step 216. According to one embodiment, a region map that was the least recently used may be selected and deleted to make room for the newly generated region map.

Either upon generation of the new region map in step 212 or after the new region map has been cached in step 218, the method may branch to step 206, where the newly generated region map may be used to respond to the current I/O request.

Figure 3:
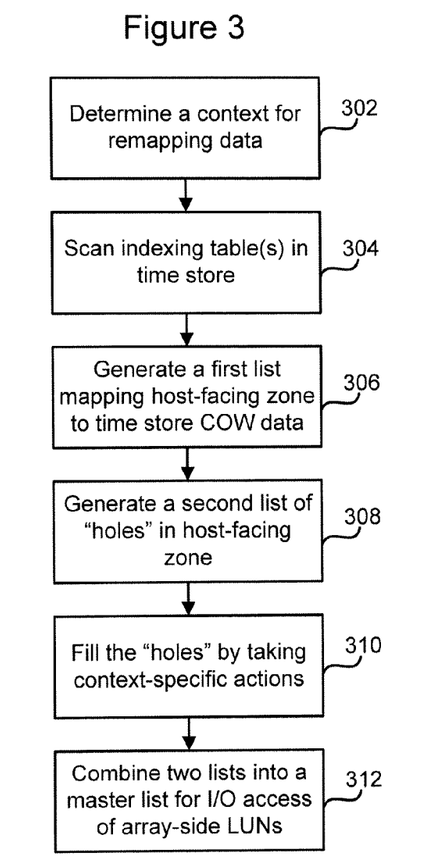
FIG. 3 shows a flow chart illustrating an exemplary procedure for remapping data in a storage management system in accordance with embodiments of the present disclosure.

FIG. 3 shows a flow chart illustrating an exemplary procedure for remapping data in a storage management system in accordance with embodiments of the present disclosure. The storage management system may comprise a time store and a current store. The storage management system and a storage system may both be coupled to a host in a way similar to the illustration in FIG. 1. The storage system may present a set of primary volumes to the host while the current store may present a set of secondary volumes (or TimeSafe LUNs) to the host. The TimeSafe LUNs are also referred to as host-facing LUNs, and the current store LUNs are referred to as array-side LUNs. The time store may record therein COW data in response to write commands directed to the primary volume. The TimeSafe LUNs (the current store) may maintain a mirror copy of the primary volumes.

In step 302, a context for remapping data may be determined. The context may specify a host-facing zone (in the TimeSafe LUNs) for which a region map is to be generated, a past time for which historical data in that zone are requested, and the nature of I/O request(s) triggering the remapping procedure. As explained below, the remapping procedure may be different depending on the context (e.g., I/O requests directed at before images, time images, or instant restores).

In step 304, indexing table(s) in the time store may be scanned in order to map the host-facing zone to COW data in the time store. Depending on the context, one or more indexing tables or the COW data themselves in the time store may be scanned for relevant data. For example, if the I/O requests are only concerned with before images, only before image indexing tables may be scanned. To accommodate time image writes, however, it may be necessary to first scan after image indexing tables before scanning the before image indexing tables.

In step 306, a first list may be generated to map the host-facing zone to COW data in the time store. By scanning the indexing tables and/or COW data, a first mapping list may be generated that matches some or all storage addresses in the host-facing zone to storage locations (in the time store) that hold COW data relevant to the historical data existing at those storage addresses of the host-facing zone at a specified time.

In step 308, a second mapping list is generated to indicate storage addresses ("holes") in the host-facing zone for which no COW data are available in the time store to provide the historical data needed.

In step 310, the "holes" may be "filled" by taking context-specific actions. That is, for those storage addresses in the zone there is no relevant information in the time store, additional data may be retrieved from other sources based on the context. For example, for a time image read, the additional data needed for the requested historical data may be located in the current store. Therefore, one or more storage locations in the current store may be identified. For a time image write, additional storage may be allocated in the time store and the newly allocated storage locations may be identified. These additional storage locations identified may be used to update the second mapping list as correlating to the "holes" in the host-facing zone.

In step 312, the two mapping lists may be combined into one mapping list or region map which lists all the storage locations in the array-side LUNs which should be read to respond to I/O requests directed to the historical data in the host-facing zone. The region map may be cached and may be updated to reflect, for example, changes in the current store or writes to the historical data.

For a better understanding of the technique for remapping data a storage management system, exemplary implementation details are provided below.

It may be desirable that the remap engine be able to perform data remapping quickly enough to have satisfactory I/O performance for time image operations and during instant restores. It may also be desirable if the remap engine does not require an unreasonable amount of system resources, in terms of CPU, memory, or disk space.

The remap engine may require access to storage space to store database tables that represent region map data for each zone. The amount of storage space needed may depend on the number of zones that the remap engine is configured to handle. Some experimentation may be done to optimally size the disk space allocated to the remap engine. The allocation of CPU and memory resources may be similarly optimized.

According to an exemplary embodiment, the remap engine may be implemented using a Berkeley database. As indexing chunks are sealed, a coarse-grained bitmap table (BMT) may be provided to indicate "dirty" regions for that chunk. These individual coarse-grained BMTs may later be merged (e.g., through OR-ing operations) to create a higher-level bitmap (i.e., BMT). This hierarchical bitmap scheme may help more efficiently track changes made to storage locations.

With a remap engine implemented, writes to time images may be handled differently. For example, after image data may need to be written to an indexing database in a similar way as delayed write information is recorded. This may provide the added benefit of having time images survive across node failures.

The remap engine functionalities may be accessed by any component in the storage management system either to remap data or to perform updates to the remapped data. Usage of the remap engine functionalities may be through external application program interfaces (APIs) based on contexts. A context represents a kind of "view" of a TimeSafe LUN at a particular point in time.

A context may handle two type of remap engine operations, remaps and updates. A remap operation may be generate two lists. The first list may be of individual remappings of TimeSafe segments to time store extents. The second list may be of "holes" in the remapping, which may indicate for which TimeSafe storage units or address ranges there is no information in the time store. Depending on the context, additional data may have to be retrieved from other sources. For example, the current store may be read in the case of a time image read request, or additional storage may be allocated in the time store in the case of a time image write. An update to a context may happen whenever there is a host write to a context associated with that host-facing LUN.

Each remap and/or update operation typically takes place within a context. A context may be what gives the remap data some meaning. For example, a context may typically encapsulate such information as the TimeSafe LUN, a remap time, and information about various update types, such as after images or delayed writes. Each context may be considered a "view" of a TimeSafe LUN for a given time T. Exemplary contexts include but are not limited to a BeforeImageContext, a TimeImageContext, and an InstantRestoreContext.

A BeforeImageContext may be an interface into the time store or the indexing tables therein. A user may create a BeforeImageContext for a given time T, and all remap requests made in this context may be for time T. The Before ImageContext may accept BeforeImageUpdates as described below when the current store changes. Typically, a BeforeImageContext adds no additional kinds of data.

A TimeImageContext may be similar to a BeforeImageContext, except that the TimeImageContext includes the concept of after images for time image writes. It may be created for time T, and remap requests may be made of it. In the TimeImageContext, remap requests may be processed by first checking the after image data before checking the before image remap data. The TimeImageContext may accept either BeforeImageUpdates or AfterImageUpdates as described below.

An InstantRestoreContext may also be similar to a BeforeImageContext, except that the InstantRestoreContext includes the concept of delayed writes. An InstantRestoreContext may be created for time T, and remap requests may be made of it. In the InstantRestoreContext, remap requests may be processed by first checking the delayed write data before checking the before image remap data. The InstantRestoreContext may accept either BIZoneDataUpdates or DWZoneDataUpdates as described below.

An update may be the base class that indicates that the remap data for a given context needs to be changes, for example, due to a host write. Exemplary updates may include but are not limited to a BeforeImageUpdate, an AfterImageUpdate, and a DelayedWriteUpdate.

A BeforeImageUpdate may represent a host write to the current store. One of the objects may be created as part of the event chain for a COW operation whenever there is a remap context present. It may then be given to each context so that they may update themselves.

An AfterImageUpdate may represent a host write to a time image LUN. One of the objects may be created as part of the event chain for a time image write operation. It may then be given to the TimeImageContext representing that time image LUN so that the TimeImageContext may become updated.

A DelayedWriteUpdate may represent a host write to a TimeSafe LUN that is currently in an instant restore mode. One of the objects may be created as part of the event chain for a COW operation. It may then be given to the InstantRestoreContext representing that TimeSafe LUN so that the InstantRestoreContext may become updated.

During I/O operations, it may be desirable for the I/O processes to know about all currently active contexts, so that they may be updated as host writes enter the system.

A COW I/O event chain may have embedded therein an event containing (or derived from) BIZoneDataUpdate as described below. When the event executes, it may send this BIZoneDataUpdate to all currently active contexts to inform them that data has moved from the current store to the time store.

A time image read event chain may include an event that contains pointers to the TimeImageContext for a corresponding time image, as well as lists for the remapped extents and holes. When it executes, this event may ask the context to remap the host-side region. For any holes in the remap list, this event may fill in the appropriate data to point to the current store LUN. These two lists may then be combined into one master list of all array-side disk extents to be read in order to fulfill the host-side read request. The mast list may then be handed off to the SGIO event for further processing.

A time image write event chain may include an event that contains pointers to the TimeImageContext for the corresponding time image, as well as lists for the remapped extents and holes. When it executes, this event may ask the context to remap the host-side region. For any holes in the remap list, this event may need to allocate storage in the time store and adjust the list to point to the newly allocated regions. These two lists may then be combined into one master list of all array-side disk extents to be overwritten in order to fulfill the host-side write request. The master list may then be handed off to the SGIO event for further processing. Additionally, for any new storage allocated, an AIUpdate may need to be created and applied to the appropriate context.

An instant restore read event chain may include an event that contains pointers to the InstantRestoreContext for the corresonding TimeSafe LUN, as well as lists for the remapped extents and holes. When it executes, this event may ask the context to remap the host-side region. For any holes in the remap list, it may fill in the appropriate data to point to the relevant current store LUN. These two lists may then be combined into one master list of all array-side disk extents to be read in order to fulfill the host-side read request. This master list may then be handed off to the SGIO event for further processing.

An instant restore delayed write event chain may include an event that contains pointers to the InstantRestoreContext for the corresponding TimeSafe LUN. This event may also contain a DWUpdate to update the InstantRestoreContext with the new delayed write location information.

According to embodiments of the present disclosure, the internal design of a remap engine may adopt the concept of a ZoneID, which may be, for example, a 64-bit globally unique identifier for a zone. A ZoneID may represent a slice of a LUN, at a specific point in time. The ZoneIDs may accommodate "overlayed" areas, such as, for example, after images of a time image or delayed writes to an instant restore. There may be room in the ZoneId structure for more overlay types, if needed in the future. A ZoneID may act as a key to access a "ZoneData" object associated with this ID. The ZoneData may be analogous to the current region map for a slice.

The ZoneData object may be the replacement for the current slice-based region map object. There may be a one-to-one mapping between a ZoneID and a ZoneData object. These may be the objects that may be managed on an LRU basis. They may probably be implemented in terms of a Berkeley database implementation.

The ZoneData objects may represent a quick view of indexing data in the time store. It could be BI tables, AI tables, DW tables, or some other data source we may want to create in the future. Each subclass encapsulates specifics on where to read its data, how to store its data, and so on.

Remap and update requests made of the context objects may eventually filter down to one or more ZoneData objects to perform the actual remapping or update operation, as these may be the only components that truly "know" where data really lives.

BeforeImageZoneData objects may get their data from a set of before image indexing tables for the corresponding zones. A BeforeImageZoneData object may handle remap requests for before image data. The BeforeImageZoneData object may accept BIZoneData updates when writes to the current store occur. These objects, unlike its counterparts AfterImageZoneData and DelayedWriteZoneData objects as described below, typically do not immediately build the data structures associated with the table scans. The BeforeImage ZoneData object may implement a threshold strategy where it starts doing the table scan to build up the zone data only after it has received a threshold number of requests for a particular zone. Before that, all remap requests may be made by consulting the hierarchal bitmap data in the new indexing tables.

AfterImageZoneData objects may get their data from a set of after image indexing tables for the corresponding time image. An AfterImageZoneData object may handle remap requests for after image data. It may accept AIZoneData updates when writes to the time image occur. These objects may start building the data structures associated with the table scans at creation.

DelayedWriteZoneData objects may get their data from a set of delayed write indexing tables for the corresponding TimeSafe LUN. A DelayedWriteZoneData object may handle remap requests for delayed write data. It may accept DWZoneData updates when writes to the TimeSafe LUN occur. These objects may start building the data structures associated with the table scans at creation.

According to some embodiments, a zone data manager may be implemented as the owner of all zone data objects. The zone data manager may know how to fetch and save ZoneData objects based on ZoneIDs. It may be the component responsible for implementing the caching strategy. The caching algorithm may be made pluggable so that it may be changed easily.

The internal API that the contexts support have to do with returning ordered lists of ZoneID objects. There may be two functions, one for getting ZoneIDs for remap operations, the other for getting ZoneIDs for update operations.

A number of internal APIs may be implemented that return ordered lists of ZoneIDs (or ZoneData objects) based on different contexts. For example, a BeforeImageContext may return an ordered list of ZoneIDs that represent which BIZoneData to query or update for the appropriate operations. A TimeImageContext may return an ordered list of ZoneIDs that represent which AIZoneData and BIZoneData objects to query or update for the appropriate operations. An InstantRestoreContext may return an ordered list of ZoneIDs that represent which DWZoneData and BIZoneData objects to query or update for the appropriate operations.

An update represents a host-side write, and therefore a change to the ZoneData objects that may be currently constructed. For example, a BIZoneDataUpdate may represent a write to a TimeSafe LUN. The BIZoneDataUpdate may contain the information about where in the time store the old contents of this extent may be found. An AIZoneDataUpdate may represent a write to a TimeImage LUN. The AIZoneDataUpdate may contain the information about where in the time store the new contents of this extent may be found. A DWZoneDataUpdate may represent a write to a TimeSafe LUN undergoing an instant restore. The DWZoneDataUpdate may contain the information about where in the time store the new contents of this extent may be found.

At this point it should be noted that the technique for remapping data in accordance with the present disclosure as described above typically involves the processing of input data and the generation of output data to some extent. This input data processing and output data generation may be implemented in hardware or software. For example, specific electronic components may be employed in a storage area network (SAN) or similar or related circuitry for implementing the functions associated with data remapping in accordance with the present disclosure as described above. Alternatively, one or more processors operating in accordance with stored instructions may implement the functions associated with data remapping in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for remapping data in a storage management system having backup data that enable restoration of historical data of a storage system, the method comprising:

receiving at least one access request for a first set of historical data;

identifying a second set of historical data, wherein the first set of historical data is a subset of the second set of historical data;

identifying, in the storage management system, one or more storage locations containing backup data for the second set of historical data;

storing a mapping list of the one or more identified storage locations to facilitate subsequent access requests for any of the second set of historical data;

updating the stored mapping list to reflect changes made to the backup data for the second set of historical data;

receiving a subsequent access request for a third set of historical data; and fulfilling the subsequent access request based on the stored mapping list of the one or more identified storage locations if the third set of historical data is a subset of the second set of historical data.

2. The method according to claim 1, wherein the second set of historical data are associated with a zone of contiguous storage units in the storage system.

3. The method according to claim 2, further comprising: repeating the steps recited therein for multiple zones in the storage system to generate and store multiple mapping lists, one mapping list for each of the multiple zones.

4. The method according to claim 3, further comprising: deleting a least recently used mapping list when there is a shortage of storage space for the multiple mapping lists.

5. The method according to claim 1, wherein the mapping list is cached for fast access.

6. A method for remapping data in a storage management system having a time store and a current store, the current store maintaining a mirror copy of current data of a storage system and the time store recording copy-on-write data for historical data of the storage system, the method comprising:
   selecting a zone in the storage system for which access requests for historical data are anticipated;
   identifying, in the time store, one or more first storage locations containing copy-on-write data for the historical data associated with the zone;
   recording the one or more first storage locations in a mapping list to facilitate subsequent access requests for the historical data associated with the zone;
   updating the mapping list to reflect relevant changes in the copy-on-write data in the time store;
   identifying, in the current store, one or more second storage locations corresponding to a portion of the zone for which there is no copy-on-write data available in the time store; and
   recording the one or more second storage locations in the mapping list;
   wherein the historical data associated with the zone existed therein at a past time specified in the anticipated and subsequent access requests.

7. The method according to claim 6, wherein the step of selecting the zone further comprises:
   receiving a threshold number of access requests for any of the historical data associated with the zone.

8. The method according to claim 6, wherein the step of identifying the one or more first storage locations further comprises:
   scanning an indexing table containing metadata associated with the copy-on-write data in the time store.

9. The method according to claim 6, wherein the anticipated and subsequent access requests include one or more access requests selected from a group consisting of: time image reads, time image writes, instant restore reads, and instant restore writes.

10. The method according to claim 6, further comprising: repeating the steps recited therein for multiple zone, thereby generating multiple mapping lists, one mapping list for each zone.

11. The method according to claim 10, further comprising: deleting, from the multiple mapping lists, one mapping list that is least recently used.

12. At least one processor readable storage medium for storing a computer program of instructions configured to be readable by at least one processor for instructing the at least one processor to execute a computer process for performing the method as recited in claim 6.

13. A system for remapping data in a storage management system having backup data that enable restoration of historical data of a storage system, the system comprising:
   means for receiving at least one access request for a first set of historical data;
   means for identifying a second set of historical data, wherein the first set of historical data is a subset of the second set of historical data;
   means for identifying, in the storage management system, one or more storage locations containing backup data for the second set of historical data;
   means for storing a mapping list of the one or more identified storage locations to facilitate subsequent access requests for any of the second set of historical data;
   means for updating the stored mapping list to reflect changes made to the backup data for the second set of historical data;
   means for receiving a subsequent access request for a third set of historical data; and
   means for fulfilling the subsequent access request based on the stored mapping list of the one or more identified storage locations if the third set of historical data is a subset of the second set of historical data.

14. A system for remapping data in a storage management system having a time store and a current store, the current store maintaining a mirror copy of current data of a storage system and the time store recording copy-on-write data for historical data of the storage system, the system comprising:
   means for selecting a zone in the storage system for which access requests for historical data are anticipated;
   means for identifying, in the time store, one or more first storage locations containing copy-on-write data for the historical data associated with the zone;
   means for recording the one or more first storage locations in a mapping list to facilitate subsequent access requests for the historical data associated with the zone;
   means for updating the mapping list to reflect relevant changes in the copy-on-write data in the time store;
   means for identifying, in the current store, one or more second storage locations corresponding to a portion of the zone for which there is no copy-on-write data available in the time store; and
   means for recording the one or more second storage locations in the mapping list;
   wherein the historical data associated with the zone existed therein at a past time specified in the anticipated and subsequent access requests.

* * * * *

UNITED STATES PATENT AND TRADEMARK OFFICE
CERTIFICATE OF CORRECTION

PATENT NO. : 7,610,320 B2
APPLICATION NO. : 11/549401
DATED : October 27, 2009
INVENTOR(S) : Passerini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this

Twelfth Day of October, 2010

David J. Kappos
*Director of the United States Patent and Trademark Office*